United States Patent Office 3,562,222
Patented Feb. 9, 1971

3,562,222
COPOLYAMIDES OF 5-t-BUTYLISOPHTHALIC ACID
James S. Ridgway, Pensacola, Fla., assignor to Monsanto Company, St. Louis, Mo., a corporation of Delaware
No Drawing. Continuation-in-part of application Ser. No. 458,482, May 24, 1965. This application June 11, 1968, Ser. No. 736,022
The portion of the term of the patent subsequent to May 14, 1985, has been disclaimed
Int. Cl. C08g 20/00
U.S. Cl. 260—78                                  5 Claims

ABSTRACT OF THE DISCLOSURE

High shrinkage polymers useful in production of hosiery and crimpy conjugate yarns are provided by linear random copolyamides of (A) at least one aliphatic diamine having the formula $NH_2(CH_2)_nNH_2$ in which $n$ is an integer from 2 to 10, (B) at least one aliphatic dicarboxylic acid having the formula $HOOC(CH_2)_mCOOH$ in which $m$ is an integer from 4 to 20 and (C) 5-t-butylisophthalic acid. Even greater shrinkage results when a portion of the aliphatic diamine component (A) is replaced with 1,4-cyclohexanebis(methylamine). Fibers made from the novel copolyamides are also useful for tire reinforcement due to their low flatspotting tendency over wide ranges of temperature and humidity.

CROSS-REFERENCE TO RELATED

This application is a continuation-in-part of my copending application Ser. No. 458,482 which was filed on May 24, 1965 and is now abandoned.

BACKGROUND OF THE INVENTION

It is well known that various polyamides such as polyhexamethylene adipamides are useful in the production of fibers for textiles and/or tire reinforcement. Although fibers prepared from previously known polyamides have found significant commercial success, a substantial effort is being continued to develop new polyamides having even more desirable properties. For example, most of the known polyamides have a relatively low boiling water shrinkage. That is, the amount of shrinkage that occurs in fibers made of such polyamides when they are immersed in boiling water is relatively small, e.g. on the order of ten percent or less. In some commercial uses, for example in hosiery, it is desirable that the polyamide fibers have a substantially greater degree of boiling water shrinkage and, in the production of conjugate fibers (i.e., fibers having two or more components) it is likewise very desirable that at least one of the components has a relatively high shrinkage in order that the crimp in the conjugate fiber is substantial and permanent.

While known polyamides have also found significant use in the reinforcement of rubber vehicle tires, one drawback in such use in their tendency to flatspot. Flatspotting is a term used to describe the out-of-roundness that occurs when a vehicle tire reinforced with polyamide fibers is at rest under weight for a period of time. The portion of the tire which is in contact with the pavement tends to flatten and when the vehicle is started again, the flatspot causes vibration of the vehicle. While the causes of flatspotting are not completely understood, a great deal of effort is being put into developing polyamide fibers which do not have such a drawback.

To overcome the aforedescribed problems, it is an object of this invention to provide novel fiber-forming co-polyamides which have a high degree of boiling water shrinkage. Another object of the invention is to provide novel fiber-forming copolyamides having a reduced tendency to flatspot when used as reinforcing fiber in rubber vehicle tires. Other objects will become apparent from the following detailed description of the invention.

SUMMARY OF THE INVENTION

It has now been discovered that the foregoing objectives can be achieved by a highly polymeric linear random co-polyamide of (A) at least one aliphatic diamine having the formula $NH_2(CH_2)_nNH_2$ in which $n$ is an integer from 2 to 10, at least one aliphatic dicarboxylic acid having the formula $HOOC(CH_2)_mCOOH$ in which $m$ is an integer from 4 to 20 and (C) 5-t-butylisophthalic acid. The objective of high boiling water shrinkage is even more markedly realized by an embodiment of the novel copolyamide in which a substantial portion of the aliphatic diamine (A) is replaced with 1,4-cyclohexanebis(methylamine).

DETAILED DESCRIPTION OF THE INVENTION

The high boiling water shrinkage of fibers produced from the copolyamides of this invention is highly unexpected in view of the very low shrinkage characteristics of similar known polyamides. Thus, for example, the boiling water shrinkage of polyhexamethylene adipamide is about ten percent and, as disclosed in U.S. Pat. 2,715,620, fibers drawn from polyamides of 5-t-butylisophthalic acid and aliphatic diamines having 5 to 10 carbon atoms are capable of withstanding boiling water without contraction. One would therefore expect that the boiling water shrinkage of a copolyamide of 5-t-butylisophthalic acid, an aliphatic diamine such as hexamethylene diamine and an aliphatic dicarboxylic acid such as adipic acid would be less than ten percent but, as demonstrated by the examples hereinafter, the shrinkage of such a copolyamide is substantially greater than ten percent and in some cases as much as two to three times that value.

The very high boiling water shrinkage of the copolyamides of this invention in which a portion of the aliphatic diamine is replaced with 1,4-cyclohexanebis(methylamine) is even more unexpected in view of the aforementioned disclosure of U.S. Pat. 2,715,620 and the teaching of U.S. Pat. No. 3,012,620 to the effect that fibers made from polyamides of 1,4 - cyclohexanebis(methylamine) and aliphatic dicarboxylic acids having 6 to 12 carbon atoms have a boiling water shrinkage of about one percent. On the basis of such prior art disclosures, it would have been expected that copolyamides of 5-t-butylisophthalic acid, 1,4 - cyclohexanebis(methylamine), an aliphatic diamine such as hexamethylene diamine and an aliphatic dicarboxylic acid such as adipic acid would have virtually no boiling water shrinkage but, as demonstrated by the examples hereinafter, the shrinkage of such a copolyamide is very substantial and in some cases as high as 30 to 70 percent.

Typically, the copolyamides of this invention are prepared by copolymerizing substantially equimolar proportions of the diamines and dicarboxylic acids. That is, the total moles of the aliphatic dicarboxylic acid and the 5-t-butylisophthalic acid in the reaction mixture are the substantial stoichiometric equivalent of the total moles of diamine in the mixture. In general, the mole percentage of 5-t-butylisophthalic acid in the mixture and the resulting copolymer is from 1 to 99 percent and preferably from 10 to 50 percent, based on the total moles of the aliphatic dicarboxylic acid and the 5-t-butylisophthalic acid. In the embodiment of the invention in which a portion of the aliphatic diamine is replaced with 1,4 - cyclohexanebis (methylamine), the mole percentage of 1,4-cyclohexanebis(methylamine) in the reaction mixture and in the resulting copolymer is likewise generally from 1 to 99 percent and preferably from 10 to 50 percent, based on the total moles of the aliphatic diamine and the 1,4-cyclohexanebis (methylamine).

Although the dicarboxylic acids and the diamine or diamines may be combined as unreacted compounds, the substantially equimolar proportions of the reactants are in many cases desirably added to the reaction mixture as the preformed salts thereof. Thus, for example, when the reaction mixture initially contains the salt of the aliphatic diamine and the aliphatic dicarboxylic acid and a salt of the 5-t-butylisophthalic acid and the aliphatci diamine or 1,4 - cyclohexanebis(methylamine), the resulting random copolyamides are generally composed of (A) 1 to 99 and preferably 50 to 90 mole percent, based on the molecular weight of the copolyamide, of units represented by the structure

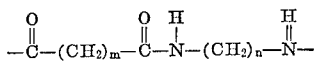

wherein $m$ is an integer from 2 to 20 and $n$ is an integer from 2 to 10 and (B) 1 to 99 and preferably 10 to 50 mole percent, based on the molecular weight of the copolyamide, of units represented by the structure

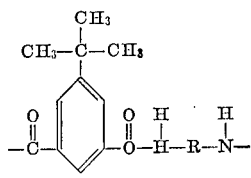

wherein R is a divalent hydrocarbon radical selected from the group consisting of 1,4-cyclohexanebis(methylene) and polymethylene containing from 2 to 10 carbon atoms.

The aliphatic diamines and dicarboxylic acids which are used to prepare the copolyamides of this invention are well known in the art. Examples of the aliphatic diamines are ethylene diamine, propylene diamine, tetramethylene diamine, pentamethylene diamine, hexamethylene diamine, octamethylene diamine, decamethylene diamine and the like. Suitable aliphatic dicarboxylic acids having the formula $HOOC(CH_2)_mCOOH$ in which $m$ is 2 to 20 and preferably from 2 to 10 include sebacic acid, octadecandioic acid, adipic acid, suberic acid, brassylic acid, undecanedioic acid, glutaric acid, pimelic acid, azelaic acid, tetradecanedioic acid and the like. Preferably, the aliphatic diamine is hexamethylene diamine and the aliphatic dicarboxylic acid is adipic acid. It will also be understood that the diamines and dicarboxylic acids employed in the present invention can be added to the reaction mixture as their amide-forming derivatives which, for the diamines, include the corresponding carbamates and N-formyl derivatives and, for the acids, include the corresponding mono-and diesters, anhydrides, mono-and diamides and acid halides.

The copolyamides of this invention are prepared by procedures known in the art and commonly employed in the manufacture of simple polyamides. That is, the reactants are heated at a temperature of from 180° C. to 300° C. and preferably from 200° C. to 295° C. until the product has a sufficiently high molecular weight to exhibit fiber-forming properties, which properties are reached when the copolyamide has an intrinsic viscosity of at least 0.4. The reaction can be conducted at superatmospheric, atmospheric, or subatmospheric pressure. It is often desirable, especially in the last stage of the reaction, to employ conditions, e.g. reduced pressure which will aid in the removal of the reaction-by-products. Preferably the reaction is carried out in the absence of oxygen, for example, in an atmosphere of nitrogen.

Intrinsic viscosity as employed herein is defined as $$\lim_{C \to 0} \left( \frac{\log_e N_r}{C} \right)$$

in which $N_r$ is the relative viscosity of a dilute solution of the polymer in m-cresol in the same units at the same temperature and C is the concentration in grams of polymer per 100 cc. of the solution.

In order to illustrate the invention and the advantages thereof with greater particularity, the following specific examples are given. It is to be understood that they are intended to be only illustrative and not limitative. Parts are given by weight unless otherwise indicated.

Example I

A solution containing 151.1 parts (90 mole percent) of hexamethylene-diammonium adipate and 21.78 parts (10 mole percent) of hexamethylene-diammonium 5 - t-butylisophthalate dissolved in 50 parts of water was placed in a stainless-steel high-pressure autoclave which had been previously purged of oxygen with purified nitrogen. The temperature and pressure within the autoclave were slowly raised until values of 220° C. and 250 p.s.i.g., respectively, were reached. The temperature was then further increased to 243° C. while the pressure was maintained at 250 p.s.i.g. by removal of steam. Thereafter, the pressure within the autoclave was gradually reduced to atmospheric over a 25-minute period. During this period the temperature was allowed to level out at 280° C. at which temperature the polymer melt was allowed to equilibrate for 30 minutes. The resultant polymer was nearly transparent and had a melting point of approximately 251° C. This molten polymer was melt spun directly from the bottom of the autoclave through a singlehole spinneret to yield a mono-filament yarn having good textile properties.

Example II

A solution of 130.2 parts (80 mole percent) of hexamethylenediammonium adipate and 42.0 parts (20 mole perecent of hexamethylenediammonium 5-t-butylisophthalate dissolved in 60 parts of water was added to a stainless-steel high-pressure autoclave. Polymerization of this mixture was brought about by the procedure set forth in Example I. The resulting polymer was substantially transparent and had a melting point of approximately 237° C. The finished polymer was melt spun directly from the autoclave through a single-hole spinneret to yield a monofilament yarn having good textile properties.

Example III 95.2 parts of hexamethylenediammonium adipate, 41.2 parts of hexamethylenediammonium 5-t-butylisophthalate and 35.1 parts of 1,4 - cyclohexanebis(methylammonium) adipate were dissolved in 100 parts of water to provide a solution in which 20 mole percent of the total moles of diamine was 1,4 - cyclohexanebis(methylamine) and 20% mole percent of the total moles of dicarboxylic acid was 5-t-butylisophthalic acid. The solution was added to a stainless-steel high-pressure autoclave and polymerization was carried out as in Example I. The resulting substantially transparent polymer had a melting point of 240° C. and was spun into a mono-filamet yarn having good textile properties.

Example IV

A solution was prepared by introducing a mixture of 44.32 parts of hexamethylene diamine and 55.7 parts of adipic acid (70 mole percent) and a mixture of 24.02 parts of 1,4-cyclohexanebi(methylamine) and 37.78 parts of 5-t-butylisophthalic acid (30 mole percent) into 80 parts of water. This solution was added to a stainless-steel high-pressure autoclave and polymerization was carried out as in Example I. The resulting substantially transparent polymer had a melting point of 226° C. and was spun into a mono-filament yarn having good textile properties.

Comparative tests were conducted to determine relative boiling water shrinkage in comparison to a conventional polyhexamethylene adipamide (nylon 66) yarn. The yarns were immersed in boiling water for a period of 5 minutes and their lengths were measured before and after the immersion. The percent boiling water shrinkage is determined by the following formula:

$$\frac{\text{Length before exposure} - \text{length after exposure}}{\text{length before exposure}} \times 100 = \text{percent boiling water shrinkage}$$

The results obtained in this test are illustrated by the following table:

| Example: | Boiling water shrinkage, percent |
|---|---|
| I | 19.8 |
| II | 30.2 |
| III | 34.0 |
| IV | 73.3 |
| Nylon 66 (control) | 10.3 |

As can be seen from the above table, the yarns prepared from the copolyamides of the present invention exhibit significantly higher boiling water shrinkages than yarns prepared from conventional polyamides such as nylon 66.

Yarns made from the copolyamides of the present invention were formed into cords and used to reinforce rubber vehicle tires. The tires thus formed were tested for flatspot severity and were found to have a significantly lower tendency to flatspot than conventional polyhexamethylene adipamide-reinforced tires. This reduction in flatspot was maintained over a wide variety of temperatures and humidities, thus eliminating the need for additional additives to counteract the effect of atmospheric changes.

As many widely different embodiments of this invention may be made without departing from the spirit and scope thereof, it is to be understood that the invention is not to be limited by the specific embodiments set forth herein but only by the claims which follow.

I claim:
1. A highly polymeric linear random copolyamide composed of (A) from 50 to 90 mole percent of units represented by the structure

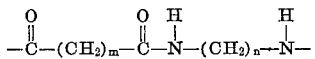

wherein $m$ is an integer from 2 to 20 and $n$ is an integer from 2 to 10 and (B) from 10 to 50 mole percent of units represented by the structure

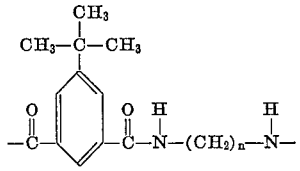

wherein $n$ has the aforedescribed significance.

2. The copolyamide of claim 1 wherein $m$ is an integer from 2 to 10.
3. The copolyamide of claim 1 wherein $m$ is 4.
4. The copolyamide of claim 1 wherein $n$ is 6.
5. The copolyamide of claim 1 wherein $m$ is 4 and $n$ is 6.

References Cited
UNITED STATES PATENTS

| 2,715,620 | 8/1955 | Carlston et al. | 260—78 |
| 3,012,994 | 12/1961 | Bell et al. | 260—78 |
| 3,383,369 | 5/1968 | Ridgway | 260—78 |
| 3,426,001 | 2/1969 | Ridgway | 260—78 |

HAROLD D. ANDERSON, Primary Examiner

U.S. Cl. X.R.

57—140; 152—330; 260—33.4